United States Patent [19]
Renner

[11] Patent Number: 4,740,960
[45] Date of Patent: Apr. 26, 1988

[54] SYNCHRONIZATION ARRANGEMENT FOR TIME MULTIPLEXED DATA SCANNING CIRCUITRY

[75] Inventor: Robert E. Renner, Glendale, Ariz.

[73] Assignee: GTE Communication Systems Corporation, Phoenix, Ariz.

[21] Appl. No.: 925,045

[22] Filed: Oct. 30, 1986

[51] Int. Cl.$^4$ .............................................. H04J 3/00
[52] U.S. Cl. .................................................... 370/100
[58] Field of Search .................. 370/58, 108, 16, 100, 370/99; 375/17

[56] References Cited

U.S. PATENT DOCUMENTS

| | | | |
|---|---|---|---|
| 4,359,770 | 11/1982 | Suzuka | 370/108 |
| 4,361,890 | 11/1982 | Green, Jr. et al. | 370/108 |
| 4,406,005 | 9/1983 | Simmons et al. | 370/58 |
| 4,504,947 | 3/1985 | Perry | 370/99 |
| 4,507,780 | 3/1985 | Perry | 370/100 |
| 4,514,844 | 4/1985 | Perry | 370/16 |
| 4,516,237 | 5/1985 | Perry et al. | 370/58 |
| 4,516,245 | 5/1985 | Perry | 375/17 |
| 4,531,210 | 7/1985 | Perry | 370/100 |
| 4,534,027 | 8/1985 | Perry | 370/16 |
| 4,551,585 | 11/1985 | Daniels et al. | 370/16 |
| 4,598,268 | 7/1986 | Perry | 375/17 |

*Primary Examiner*—Salvatore Cangialosi

*Attorney, Agent, or Firm*—Frank J. Bogacz; Peter Xiahros

[57] ABSTRACT

Telecommunication switching systems are typically connected by high-speed digital data spans. These spans may commonly be T1 or T2 carriers using DS1 or DS2 data formats, respectively. These systems may contain duplex digital span control units. The present synchronization arrangement is an additional duplex control circuit. This synchronization arrangement includes a time multiplexed state machine for each copy of the digital span control unit. The state machine monitors data ready signals from its own copy as well as from the other copy of the digital span control unit. Other signals indicate whether the circuit is operating in a simplex or duplex mode and which circuit is the active and which is the standby copy. This circuitry detects whether the data ready signals for each copy are identically synchronized. If these data ready signals are not identically synchronized, then one copy of the circuitry waits a predetermined scan cycle time for the other copy of the circuit to catch up. For non-error conditions, the wait places the two copies back in synchronization. In order to avoid delaying down stream processing, this arrangement addresses these signals ahead of the time for which they are required for processing by the circuitry.

15 Claims, 2 Drawing Sheets

SYNCHRONIZATION ARRANGEMENT FOR TIME MULTIPLEXED DATA SCANNING CIRCUITRY

BACKGROUND OF THE INVENTION

The present invention pertains to digital transmission systems and more particularly to maintaining synchronization between multiple copies of time multiplexed data scanning equipment.

Modern telecommunication systems transmit large amounts of data rapidly between systems. Digital spans are utilized to connect these systems and to transmit this data. The switching system usually contains a number of digital spans, each span transmitting data at a high rate between switching systems.

For public policy reasons, these switching systems must be highly reliable. In order to achieve this reliablity, these systems are often implemented with redundant equipment. This redundancy scheme is a way of providing for fault tolerance of the system. That is, if one portion of the system fails there is a second portion of the system performing exactly the same process. The system functions properly, but in a simplex mode.

The redundant equipment is typically operated in a synchronous fashion. This prevents total system down time as a result of switch-over from one copy of the equipment to the other. It also provides a means of fault detection if the two copies differ.

U.S. Pat. No. 4,531,210 and 4,507,780 deal with duplex digital span controllers for one such system. This system is the GTD-5 EAX manufactured by GTE communication Systems Corporation, the assignee of the present application. These patents teach duplex digital control units which operate synchronously. However, these digital control units serve a number of digital spans and therefore require a multiplexing operation. Because of the high-speed data and the nature of scanning, signal propagation times through similar circuits may vary. That is, at a particular instant, one copy of a circuit may see a bit set and the other duplex copy of that circuit may not see the corresponding bit set. Therefore, synchronization is difficult to maintain in multiplexed data scanning.

Accordingly, it is an object of the present invention to provide an arrangement for maintaining synchronization between multiple copies of time multiplexed data scanning circuitry.

SUMMARY OF THE INVENTION

A plurality of digital spans are connected between one telecommunication system and another telecommunication system. In each telecommunication system, a duplex pair of synchronously operated digital control units is included. One of the digital control units is operated to scan the plurality of digital spans for data as an active unit, while the other unit of the duplex pair is operated to scan the same plurality of digital spans for data as a standby unit. Each of the digital control units includes a synchronization arrangement.

Each synchronization arrangement has a clock circuit which is operated to produce periodic time slot signals. An addressing circuit is connected to the clock circuit. The addressing circuit operates to produce a time slot address which is incremented by a predetermined offset with respect to the time slot signals. A pipe line circuit is connected to the clock circuit, to the plurality of digital spans and to the other digital control unit of the duplex pair. The pipe line circuit operates to delay the scanned data received from each of the plurality of digital spans by the predetermined time slot offset.

Lastly, the synchronization arrangement includes a state machine. The state machine is connected to the pipe line circuit, to a corresponding digital control unit and to the pipe line circuit of the other digital control unit. The state machine operates in response to the absence of a buffer full signal from the other digital control unit and operates in response to a buffer full signal of the corresponding digital control unit, to delay transmission of both buffer full signals for a predetermined number of time slot signals. As a result, the buffer full signals of both digital control units are synchronized.

A BRIEF DESCRIPTION OF THE DRAWINGS

DESCRIPTION OF THE PREFERRED EMBODIMENT

Figure 1:
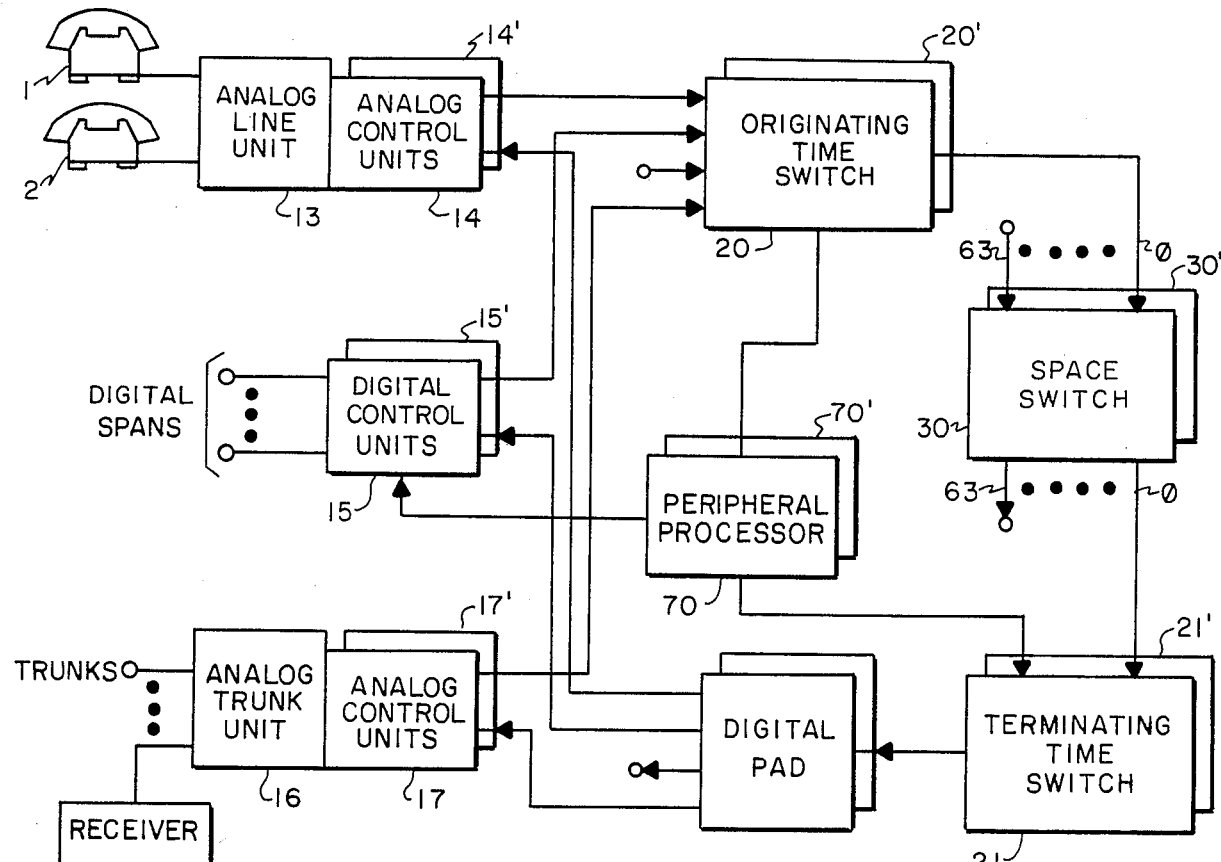
FIG. 1 is a block diagram of a switching system featuring the interconnection of digital spans to the switching system through digital control units.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using commonly available $T_1$ digital span equipment such as a model 9004 manufactured by Siemens Transmission Systems Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Figure 2:
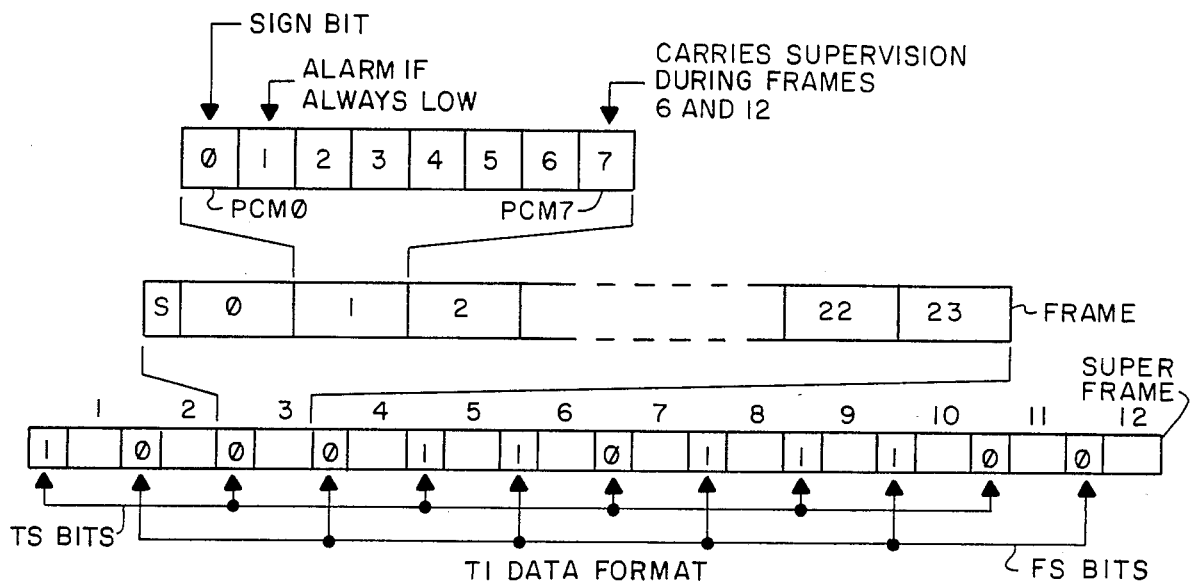
FIG. 2 is a bit and frame format of T1 transmission for the digital spans shown in FIG. 1.

The nature of a T1 data and its format is shown in FIG. 2. Each voice sample consists of eight bits, PCM0–PCM7. PCM0 is a sign bit. PCM1–PCM7 give the magnitude of the voice sample. PCM1 may also be used to convey alarm indications. PCM7 is used to carry supervision information during frames 6 and 12.

Twenty-four voice samples are organized together with an S bit to form a frame. Each voice sample in the frame is associated with one channel of voice (or data). The channels are numbered 0–23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Every time a TS bit occurs, a frame detector compares it with the value that it expects to see (ones during frames 1, 5, and 9; zeroes during frames 3, 7, and 11). If the TS bit disagrees with the expected value, it is considered an error. If two errors occur during any five consecutive examinations of TS bits for a digital span (T-carrier), then that digital span is considered to be out of frame. An alarm condition is operated. Eventually, an attempt will be made to reframe that T-carrier.

Examination of FS bits is an analogous procedure to that of the TS bits.

When reframing is attempted for a digital span, the frame detector examines each bit position for a period of 16 frames. If any bit position has consistently toggled during alternate frames, then that bit position is assumed to be the correct framing bit position, and the contents of a write vector will be updated to reflect the new S bit position.

If the TS pattern is properly aligned, but the FS pattern is in error, the frame detector will increment a write vector by four frame positions. This will occur every time the FS pattern is in error until eventually the write vector is properly aligned with the incoming FS pattern.

Figure 3:
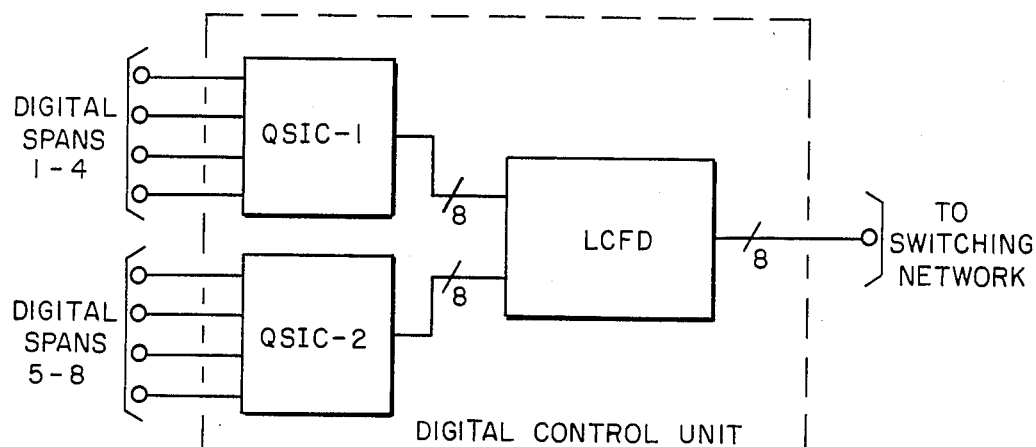
FIG. 3 is a block diagram of a portion of the digital control unit which processes the conversion of digital span data from serial to parallel and buffers the data for up to 8 digital spans.

FIG. 3 depicts a portion of the circuitry included in each of the digital control units 15 and 15'. Each digital control unit controls up to 8 digital spans. Digital control units 15 and 15' as shown in FIG. 1, are duplex digital control units. This means that each digital control unit 15 and 15' handles data transmission between the switching system and the same 8 digital spans. Further, digital control units 15 and 15' operate synchronously. This is, they perform the same task at the same time in order to provide a fault tolerant system. This system allows a failure in one of the digital control units 15 or 15' and permits the switching system to operate through the other unit of the duplex pair.

The connection of 8 digital spans to a digital control unit such as 15 or 15' is shown. Digital spans 1 through 4 are shown connected to QSIC-1 (Quad Span Interface Circuit). Digital spans 5 through 8 are shown connected to QSIC-2. Digital spans 1 through 4 and 5 through 8 are also connected to QSIC-1' and QSIC-2' respectively. These QSICs and connections are not shown in FIG. 3. Each QSIC converts the information to or from the digital spans from serial to parallel and sets a flag (buffer full) when 8 bits of data have been collected for a particular digital span. Each QSIC performs these functions for the 4 digital spans to which it is connected.

QSIC-1 and QSIC-2 are connected to the LCFD (Line Compensator and Framing Detector). The LCFD scans each of the 8 flags representing the 8 digital spans at a rate which is twice as fast as the data rate of a digital span. Data is taken from a particular digital span when the flag is set. When one copy of the duplex LCFDs sees the flag for data set for a particular digital span, the other copy may not at that exact time see the flag set. However, this copy of the LCFD should see the flag set on its next scan.

Although the duplex LCFDs are operating synchronously, they may not see the flag set during the same scan because of the propagation delays of signals through various logic. Therefore, in order to provide synchronization between the two duplex LCFDs and correspondence between the two duplex digital control units 15 and 15', the synchronization circuitry of FIG. 4 is provided.

Figure 4:
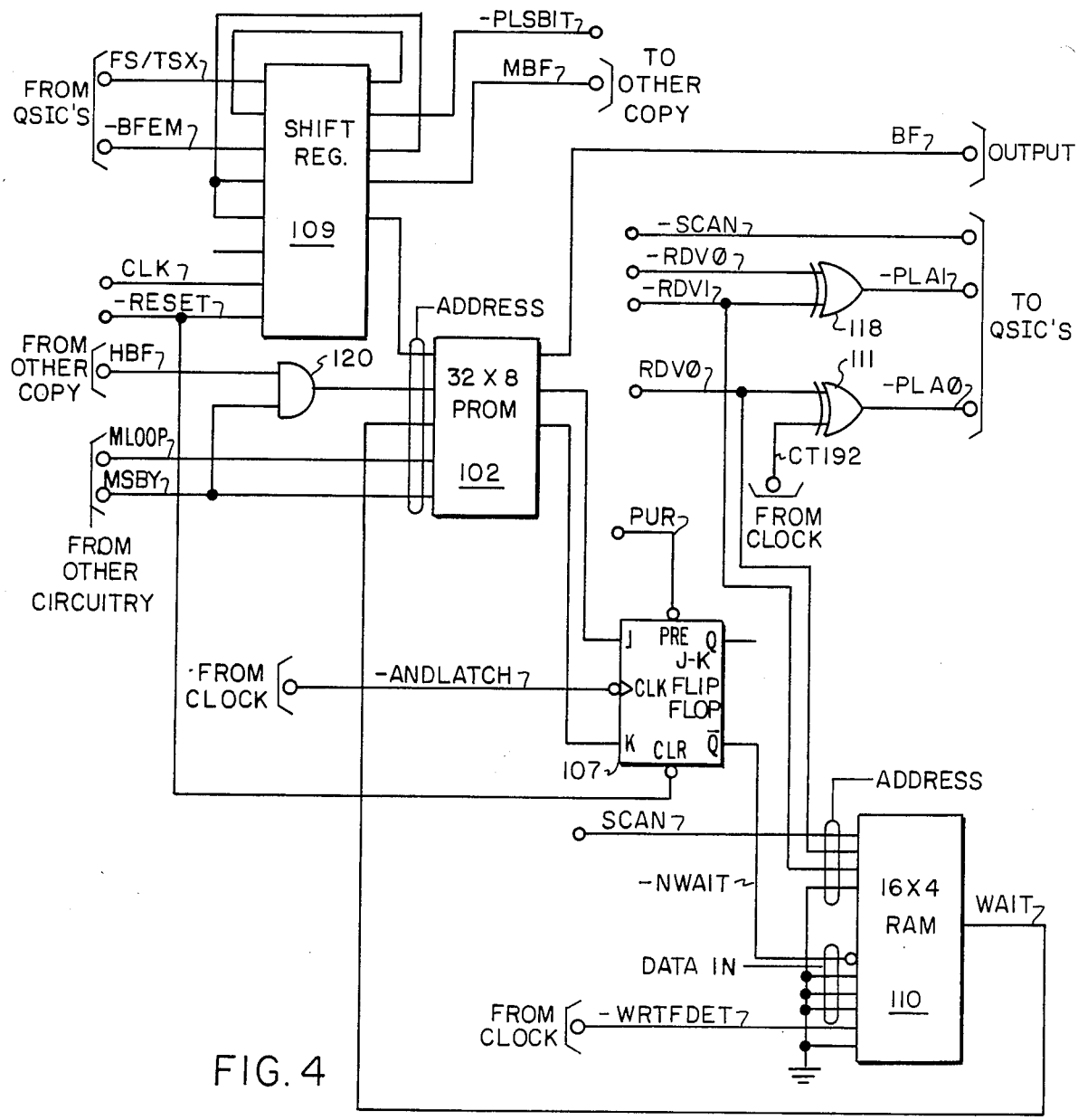
FIG. 4 is a schematic diagram of a portion of the LCFD circuit of FIG. 3, embodying the principals of operation of the present invention.

FIG. 4 depicts the circuitry in one copy of the digital control unit for maintaining synchronization during scanning. During one clock cycle the LCFD scans one of the 8 digital spans associated with it. During this clock period or time slot, a −BFEM (not Buffer Empty or Buffer Full) signal and FS/TSX signal is transmitted from the corresponding QSIC to shift register 109 via the −BFEM lead. The FS/TSX signal transmitted on the corresponding lead indicates the FS or TS bit which has been received. The −BFEM signal indicates that the span corresponding to this particular time slot has gathered 8 bits of data. Both the −BFEM and FS/TSX signals are transmitted through shift register 109 and their corresponding output connected back to another input to the shift register. These signals then emerge a second time at the output of shift register 109. These signals may be said to be "pipe lined" or time delayed. The FS/TSX signal emerges as the PLSBIT signal. The −BFEM signal emerges as both the MBF signal and the MYBF signal. The MBF and MYBF signals are exactly the same, except that they are separately buffered. The MBF signal is transmitted to the other copy of this circuit on the other digital control unit. The MYBF signal is transmitted to 32 by 8 bit PROM 102.

The HBF signal is the corresponding MBF signal of the other copy of this circuit, located on digital control unit 15'. The two copies are cross-connected by having their MBF signal connected to AND gate 120 of the other copy via the corresponding HBF lead. The MSBY lead contains a signal which indicates that my copy is standby, if equal to logic 1. That is, one copy of the duplex digital control units is active and the other copy is standby. The MLOOP signal lead is connected to PROM 102. This signal indicates that the particular copy of the digital control unit is performing a diagnostic test and is, therefore, operating in a simplex mode. The MSBY lead is also connected to AND gate 120. AND gate 120 is connected to one of the address inputs of PROM 102. One output of PROM 102 is the buffer full signal (BF). This indicates that the digital span corresponding to this particular time slot has 8 bits of data ready and buffered in the QSIC. Two other outputs of PROM 102 are connected to J-K flip-flop 107.

The −Q output of J-K flip-flop 107 is transmitted to RAM 110 via the minus NWAIT lead. This signal indicates that this copy of the LCFD must wait one scan cycle for the duplex copy of the pair before proceeding with the buffer full signal.

The read vector address is comprised of read vector signals RDV0 and RDV1 along with the SCAN signal. Together these three signals enable the circuitry to address one of the 8 digital spans. The SCAN signal is the least significant bit of the address; RDV0 the next most significant bit of the address; and, RDV1 the most significant bit of the address.

The value of the −NWAIT lead is stored in RAM 110 as a function of the digital span address which the clock (not shown) indicates. When RAM memory 110 is accessed on the next clock cycle, the WAIT lead outputs the value previously stored. RAM 110 is connected to PROM 102 via the WAIT lead.

The high order bit of the digital span address RDV1 is exclusive-OR ed with −RDV0 by exclusive-OR gate 118 to form the −PLA1 signal (pipe line address bit one). Similarly, the RDV0 signal is exclusive-OR ed with a clock signal CT192 by exclusive-OR gate 111 to form the −PLA0 signal (pipe line address bit 0). The −SCAN signal, −PLA1 signal and PLA0 signal constitute a new address which is used to address the 8 buffer status flags contained in the QSIC.

The pipe line addressing bus comprised of leads −PLA0, −PLA1 and −SCAN are used to address the buffer status of the QSIC. This address is always two time slots greater than the present value of the digital span address composed of the signals RDV0, RDV1 and SCAN. The address supplied to the QSIC is always two time slots ahead of the actual current digital span address which is being scanned. The pipe line delay of shift register 109 is two time slots. Therefore, the BFEM signal is delayed by two time slots. However, the BFEM signal addressed two time slots ahead of the current address. As a result, the output signal, buffer full (BF), is produced at the proper time slot corresponding to the digital span being scanned.

If one copy of the circuit of FIG. 4 is standby, that is, MSBY=logic 1 and the MLOOP signal=logic 1, then this circuit is operating in a simplex mode and is enabled to perform diagnostic testing. The MYBF signal controls operation of this circuit for the case of simplex diagnostic testing mode. The MBF signal which is transmitted to the other copy of this circuit is ignored by that copy. For this case. the other copy would be operating in the simplex mode also but also it would be the on-line active copy. The output signal BF (Buffer Full) will then follow the MYBF signal for a simplex test mode operation.

For the case where both copies are operating synchronously, one copy is the active copy and the other copy is the standby copy. In this synchronous duplex mode of operation, both copies follow the processing of the active copy. For example, assume that this circuit copy (the one shown in FIG. 4) is standby and the other circuit copy is active. Therefore, the MSBY signal of this copy is=logic 1 and the MLOOP signal is=logic 0. When the buffer full signal of the active copy is=logic 1, the HBF signal (His Buffer Full) will transmit this logic 1 value through AND gate 120. Because this circuit is the standby copy MSBY equal logic 1. The address used to access PROM 102 will then be controlled by the HBF signal to produce the output BF signal. In this way, the standby copy follows the active copy. The identities of the active and standby copies may change dynamically.

In the next case, this circuit copy is the active copy and the other copy is standby. For this case, the MSBY signal (My Standby) is at logic 0, because this is the active copy. In this case, the buffer full signal of the other copy (HBF) will be blocked from addressing PROM 102 by AND gate 120. The MYBF signal of this circuit copy will control the addressing of PROM 102. Further, the MBF signal produced by this circuit copy will be transmitted to the other circuit copy and control that circuit copy's operation.

For the last case, this circuit copy is the standby circuit copy (MSBY=logic 1) and this copy sees the buffer full signal for the particular digital span examined, (MYBF equal 1), and the other copy's buffer full signal has not been detected by the active copy. This may be due to slight signal propagation delays in the scanning circuitry. For this case, this copy will see HBF=logic 0. Since the two copies attempt to operate synchronously and one has seen the buffer full signal, while the other has not, PROM 102 will output signals on its two outputs connected to the J and K inputs of flip-flop 107 to cause this flip-flop 107 to set. As a result, the −NWAIT signal will be at logic 0 and cause RAM 110 to produce the WAIT signal. During the next scan cycle, this WAIT signal will inform the standby copy that it waited during the previous scan cycle and force it to read the PCM data from the QSIC. Normally, during this second scan cycle, the active copy will also see the buffer full signal and also read PCM data from his QSIC. The time skew for the detection of this signal on the first scan cycle is due to the variations and propagation delays of the signal through the logic of the two copies.

This WAIT signal thus provides a fail safe check to prevent a failure in the active copy from causing errors in both copies. As a result, on the second scan cycle for this particular digital span, the buffer full signal (BF=1) will be synchronously produced for both copies of this circuit.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A plurality of digital spans connect said one telecommunication system to another telecommunication system, said one telecommunication system including a duplex pair of synchronously operated digital control units, one said digital control unit being operated to scan said plurality of digital span for data as an active unit, another digital control unit being operated to scan said plurality of digital spans for data as a standby unit, each said digital control unit including a synchronization arrangement comprising:

clock means being operated to provide periodic time slot signals;

addressing means connected to said clock means, said addressing means being operated to produce a time slot address incremented by a predetermined time slot offset with respect to said time slot signals;

pipe line means connected to said clock means, to said plurality of digital spans and to said other digital control unit of said duplex pair, said pipe line means being operated to delay said scanned data received from each of said plurality of digital spans by said predetermined time slot offset, said pipe line mans including means for delaying, said means for delaying being connected to said clock means and to said plurality of digital control units, said connection of said means for delaying to each of said plurality of digital control units including a buffer full signal lead and a framing and synchronization signal lead; and state machine means connected to said pipe line means, to a corresponding digital control unit and to said pipe line means of said other digital control unit, said state machine means being operated in response to an absence of a buffer full signal of said other digital control unit and being operated in response to a buffer full signal of said corresponding digital control unit to delay transmission of said buffer full signals for a predetermined number of time slot signals for synchronizing said buffer full signals of said corresponding and said other digital control units.

2. A synchronization arrangement as claimed in claim 1, said means for delaying including shift register means, said framing and synchronization signal and said buffer full signal leads being connected to said shift register means as inputs, outputs corresponding to said inputs of said frame and synchronization signal lead and said buffer full signal lead being connected to second inputs of said shift register means having corresponding second outputs for delaying said framing and synchronization signal and said buffer full signal by predetermined time offset from said first input to said second output.

3. A synchronization arrangement as claimed in claim 2, wherein said addressing means includes:
least significant address bit means;
next significant address bit means;
most significant address bit means;
first gating means connected between said most significant address bit means and said next significant address bit means and said corresponding digital control unit for transmitting a most significant pipe line address bit; and
second gating means connected between said next significant address bit means and said clock means and said corresponding digital control unit for transmitting a next most significant pipe line address bit signal.

4. A synchronization arrangement as claimed in claim 3, wherein said first gating means includes exclusive-OR gating means.

5. A synchronization arrangement as claimed in claim 3, said second gating means including exclusive-OR gating means.

6. A synchronization arrangement as claimed in claim 3, said state machine means including third gating means connected to said other digital control unit via said other unit's buffer full signal lead and connected to a standby signal lead of said corresponding digital control unit.

7. A synchronization arrangement as claimed in claim 6, said third gating means including AND gating means.

8. A synchronization arrangement as claimed in claim 6, said state machine means including first memory means connected to said third gating means, to said shift register means and to said corresponding digital control unit, said first memory means operated to produce a plurality of predefined outputs for each of said plurality of digital spans.

9. A synchronization arrangement as claimed in claim 8, said first memory means including programmable read only means.

10. A synchronization arrangement as claimed in claim 9, said programmable read only memory means including a read only memory of approximately 32 word by 8-bit memory.

11. A synchronization arrangement as claimed in claim 8, said state machine means further including latching means connected to said clock means and to said first memory means, said latching means being operated to store certain of said plurality of outputs of said first memory means.

12. A synchronization arrangement as claimed in claim 11, said latching means including J-K flip-flop means.

13. A synchronization arrangement as claimed in claim 11, said state machine means further including second memory means connected to said latching means, to said clock means, to said addressing means and to said first memory means, said second memory means being operated to store an indication to inhibit transmission of said buffer full signal for said corresponding digital control unit.

14. A synchronization arrangement as claimed in claim 13, said second memory means including random access memory means.

15. A synchronization arrangement as claimed in claim 13, wherein said random access memory means includes a random access memory of size of approximately 16 words by 4-bits in length.

* * * * *